United States Patent [19]
Penketh

[11] Patent Number: 6,107,716
[45] Date of Patent: Aug. 22, 2000

[54] POWER-ASSISTED STEERING ASSEMBLIES

[75] Inventor: David Michael Penketh, West Midlands, United Kingdom

[73] Assignee: TRW Lucas Varity Electric Steering Ltd., West Midlands, United Kingdom

[21] Appl. No.: 09/319,376

[22] PCT Filed: Dec. 18, 1997

[86] PCT No.: PCT/GB97/03475

§ 371 Date: Aug. 6, 1999

§ 102(e) Date: Aug. 6, 1999

[87] PCT Pub. No.: WO98/26972

PCT Pub. Date: Jun. 25, 1998

[30] Foreign Application Priority Data

Dec. 19, 1996 [GB] United Kingdom .................... 9626298

[51] Int. Cl.[7] .................................................... H02K 5/00
[52] U.S. Cl. ............................ 310/89; 310/91; 310/67 R; 310/68 B; 310/68 R; 74/388 PS; 180/79.1; 180/443
[58] Field of Search .............................. 310/89, 91, 67 R, 310/68 B, 68 R, 85, 99; 74/388 PS; 180/79.1, 443, 444

[56] References Cited

U.S. PATENT DOCUMENTS

| | | | |
|---|---|---|---|
| 4,473,128 | 9/1984 | Nakayama et al. | 180/142 |
| 5,738,183 | 4/1998 | Nakajima et al. | 180/444 |
| 5,796,198 | 8/1998 | Sugino et al. | 310/89 |
| 5,819,871 | 10/1998 | Takaoka | 180/444 |
| 6,012,347 | 1/2000 | Hasegawa | 74/388 PS |
| 6,013,960 | 1/2000 | Yoshida | 310/68 B |

FOREIGN PATENT DOCUMENTS

| | | |
|---|---|---|
| 4410061A1 | 9/1994 | Germany . |
| 2101811A | 1/1983 | United Kingdom . |

*Primary Examiner*—Nestor Ramirez
*Assistant Examiner*—Thanh Lam
*Attorney, Agent, or Firm*—Tarolli, Sundheim, Covell, Tummino & Szabo L.L.P.

[57] ABSTRACT

A housing assembly for an electrical device (such as an electronic circuit) is disclosed in which a support member is provided in a compartment to physically divide a componentry sensitive to such radiation. In a preferred embodiment, an electric power-assisted steering system is disclosed of the kind in which an electric motor (12) is connected through a gearbox to an output shaft operatively connected to a steering column of the vehicle and in which a one-piece housing (1) is provided which defines two discrete compartments (2, 3). A first compartment (3) is adapted to house the motor and the gearbox, and a second compartment (2) is adapted to house a motor control circuit and a motor drive circuit, a support member (21) being adapted to provide a physical banner between the two circuits. The one-piece housing (1) is advantageous in that it reduces the number of potential openings through which electromagnetic radiation may pass compared with providing multiple housings.

10 Claims, 4 Drawing Sheets

POWER-ASSISTED STEERING ASSEMBLIES

FIELD OF THE INVENTION

The invention relates to improvements in housings for electrical devices, and in particular, but not exclusively, electric power-assisted steering systems for vehicles of the kind comprising an electric motor connected through a gearbox to an output shaft operatively connected to a steering column of the vehicle. In particular, the invention relates to reduction in the susceptibility of an electrical system to electromagnetic noise.

BACKGROUND OF THE INVENTION

It is well known to provide electrical systems which incorporate both high power electronic and low power electronic components in a single design. For efficiency of space, it is often desirable to incorporate both kinds of components into a single housing unit but this can create problems due to electromagnetic interference. Hence, it is common practice to split the high and low power devices into separate housings.

For example, in electric power assisted steering systems of the kind set forth, the electric motor is used to assist a driver of the vehicle in turning the steering column, by applying an assistance torque of the same sense as the torque applied by the driver, which makes it easier to turn the steering wheel, for example during parking. The motor is controlled by motor control circuitry and drive circuitry. The control circuitry is typically connected to a torque sensor associated with the steering column and adapted to provide a signal indicative of the torque demand by the driver. The motor drive circuitry is adapted to switch the motor drive currents between, for example, different phases in the motor under the control of the motor control circuitry. It typically comprises a plurality of high power transistors connected in a bridge as it must handle the relatively high currents demanded by the motor. The transistors are switched under the control of the control circuitry.

Electric motors are known to be relatively strong sources of electromagnetic radiation which can cause interference problems with other electronic circuitry provided in the motor vehicle and, in particular with the control circuitry in the steering system. Furthermore, because of the limited choice of positions in which the steering system can be mounted within the increasingly cramped confines of a vehicle, it is often exposed to many other sources of electromagnetic radiation. External sources of radiation, such as overhead power lines, can also produce electromagnetic radiation which can cause interference. In a safety critical application such as a power-assisted steering system, it is important to provide a high level of shielding from this electromagnetic radiation to minimise the susceptibility of the electronic control and drive circuitry from interference.

It is already known to overcome the problem of electromagnetic interference by providing the drive and control circuitry inside separate conductive casings which are bolted onto a main housing body which contains the gearbox. Another casing is provided which houses the motor. The purpose of providing the separate casings is to isolate the electronic circuitry from the motor and gearbox. However, each casing requires a separate cover or other opening to allow installation and maintenance. These openings provide potential points of leakage and entrance of radiation through the various associated seals.

SUMMARY OF THE INVENTION

According to one aspect, the invention provides a housing assembly for an electric power-assisted steering system of the kind in which an electric motor is connected through a gearbox to an output shaft operatively connected to a steering column for a vehicle, characterised in that the housing defines at least two discrete compartments, a first one of the compartments being adapted to house the motor and the gearbox, and a second one of the compartments being adapted to house a motor control circuit and a motor drive circuit, a support member being adapted to provide a physical barrier between the drive circuit and the control circuit, and in which the support member is adapted to form a seal with said housing substantially to prevent electromagnetic radiation transmitting from one side of the support member to the other side of the support member.

Preferably, the compartment is closed by a lid member to seal the inside of the compartment substantially from the outside of the compartment.

Preferably the housing is a one-piece housing.

The motor may comprise a part of the electrical power assisted steering system.

An advantage of physically separating the two circuits (or electrical devices) is that the electromagnetic radiation emitted by one of the circuit is substantially shielded from the other circuit, reducing noise.

It will be understood that the term electrical device should be given a broad interpretation to include, for example, an electronic circuit or other assembly of discrete electrical and electronic components or even a combination of electrical/electronic components and a primarily mechanical device such as an electrical motor.

The housing may further comprise a second compartment which is part of a one-piece housing and is adapted to contain a motor that is electrically connected to the motor drive circuitry.

An advantage of a one-piece housing is that there are less openings which may provide a passage for electromagnetic radiation between the two compartments, eliminating the rigorous requirements for sealing of openings. The benefits of this invention extend to systems other than electrical power steering systems where isolation is advantageous.

Conveniently, the compartment containing the support member is closed by a lid portion.

The support member may be adapted to form a seal with said one-piece housing to prevent electromagnetic radiation transmitting from one side of the support member to the other side of the support member and visa-versa.

Preferably, the support member may be adapted to be mounted onto a printed circuit board (PCB) which carries at least one of the drive circuitry and the control circuitry or both. This is advantageous as it allows the support member to provide additional structural reinforcement to the PCB.

Most preferably, the support member is adapted to act as a heatsink. The support member may support parts of the drive circuitry e.g. the bridge transistors and or a regulator. This can help to eliminate the need for cooling vents in the housing or lid portion. In this case the support member may be formed from any heat conducting material where it is to act as a heatsink. Metal may be used as this is a good conductor of heat. In one preferred embodiment, the support member may be formed as an integral part of a one-piece housing but be made from a different material to the housing (i.e. a casting with an insert).

By providing a support member and one-piece housing in accordance with the present invention, the drive circuitry for the motor (which carries a relatively high current) can be isolated from the control circuitry (which carries only low power signals). This helps to prevent electromagnetic radiation emitted by the high power components causing interference in the low power components.

Of course, it will be apparent to the skilled man that the support member may be formed as an integral part of the one-piece housing and not as a separate barrier. If it is an integral part, it could be formed from the same material as the remainder of the housing, or from a different material.

The support member may be adapted to be bolted onto the housing through the PCB so as to support the PCB in place. Additionally, the portion of the one-piece housing containing the gearbox and the motor may also be divided into two chambers, one containing the gearbox, the other the motor.

BRIEF DESCRIPTION OF THE DRAWINGS

An embodiment of the invention will now be described, by way of example only, with reference to the accompanying drawings of which.

DESCRIPTION OF A PREFERRED EMBODIMENT

Figure 1:
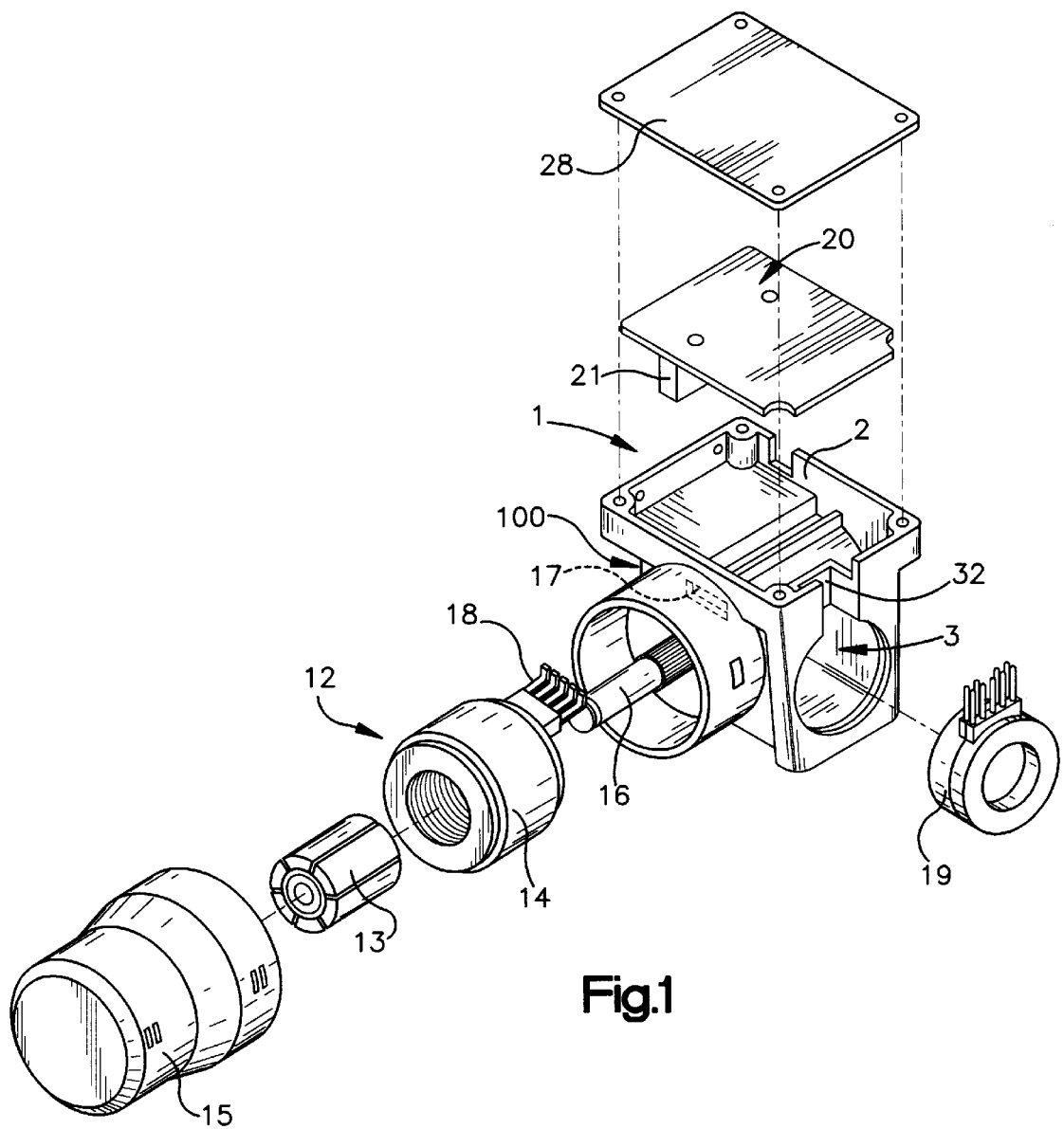
FIG. 1 is an exploded view of an electric power-assisted steering system in accordance with the present invention.

FIG. 1 shows an exploded view of an electric power assisted steering system.

A one-piece housing 1 is provided which accommodates, in one self contained unit, the various component parts of the power steering system, including a motor 12, a gearbox 100, a torque sensor 19 and the motor drive circuitry and control circuitry.

Figure 2:
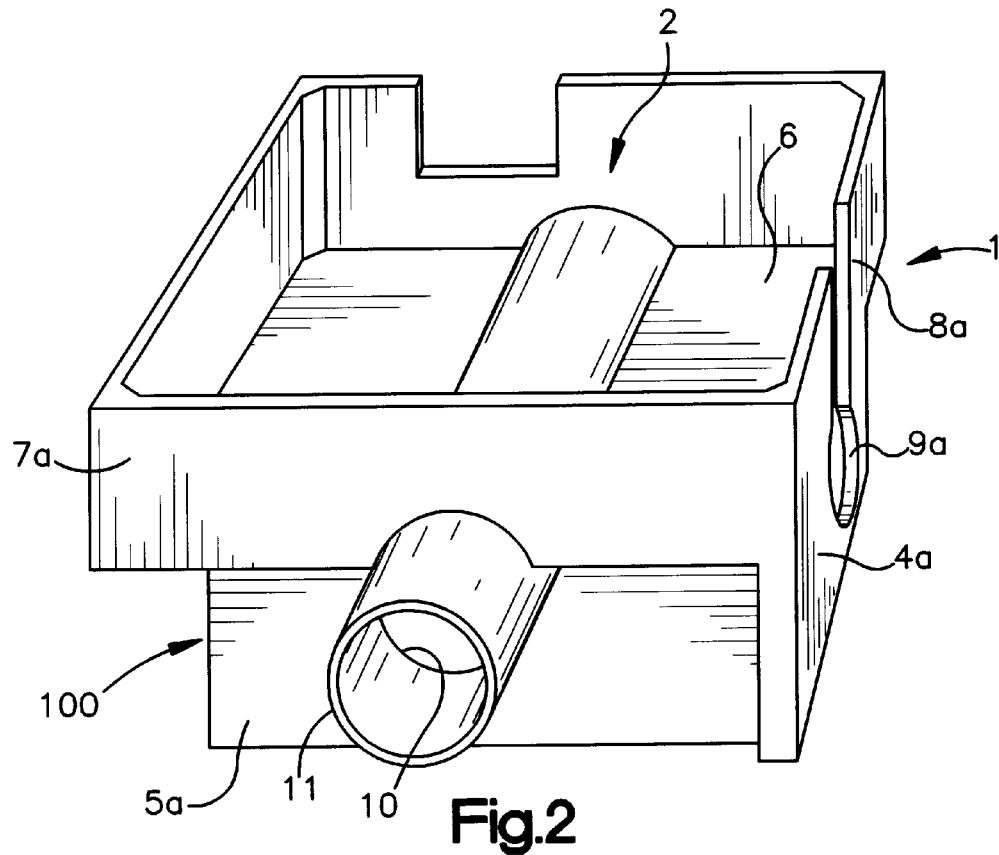
FIG. 2 is a first perspective view of the one piece housing.
Figure 3:
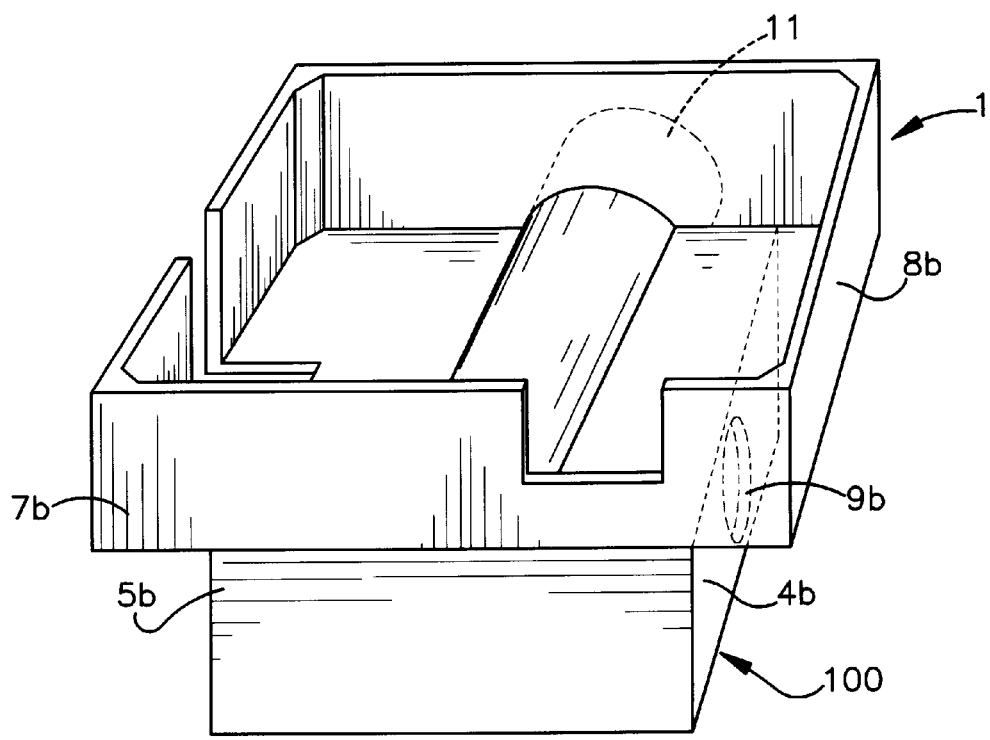
FIG. 3 is a second perspective view (from a different angle) of the housing shown in FIG. 2.

As best shown in FIGS. 2 and 3, the housing 1 is of a one piece construction and in the embodiment shown is cast from metal. The housing 1 defines two separate compartments 2,3, one disposed above the other. The lower component 3 has an upper internal face (not shown) and lower external face (not shown) and a first 4a,4b and second pair 5a,5b of orthogonal external walls. The upper compartment has a lower internal face 6 which is formed from the same part of the housing which carries the upper face of the lower compartment, and two pairs of orthogonal walls, 8a,8b,7a, 7b. However unlike the lower compartment 3, the upper compartment 2 has no internal upper face. Instead, a removable lid 28 is provided.

A substantially circular opening 9a,9b is provided in each of the first pair of orthogonal walls 4a,4b of the lower compartment of the housing. A steering column (not shown) of a vehicle is adapted to extend sealingly into the lower compartment 3 through these two openings 9a,9b. A further opening 10 is provided in one of the second pair of orthogonal walls 5a,5b of the lower compartment and is surrounded by a cylindrical shroud 11 which projects axially away from the opening 10 outside of the lower compartment 3. The motor assembly 12 which comprises a rotor 13 and a stator 14 is mounted inside the shroud 11. This eliminates the need for a separate motor casing.

An end cap 15 is placed over the motor assembly 12 to form a seal at the end of the shroud 11 distal from the main housing 1. With the steering column and the motor in place, the inside of the lower compartment 3 is sealed from the outside environment.

The motor rotor 13 is secured to a spindle 16 which extends through the motor stator and projects into the lower compartment 3. The motor rotor 13 is adapted to drive the steering column through a worm gear and worm wheel which defines the gearbox 100. A small opening is provided inside the shroud 11 extending into the upper compartment 2 to allow electrical connections from the motor assembly 12 to pass through into the upper compartment 2. The opening 17 also allows electrical connections 18 from a motor rotor position sensor (not shown) provided as a part of the motor assembly to pass through.

A recess is formed around one of the openings 9a in the first pair of orthogonal walls 4a,4b of the lower compartment 2. A torque sensor 19 is provided inside this recess in the form of an annular assembly which is adapted to fit around a portion of the steering column shaft where it extends through the opening 9a. Electrical connections 21 to and from the torque sensor 19 are adapted to extend through an opening 32 provided in the wall of the upper compartment 2 directly above the opening 9a. The torque sensor 19 is adapted to provide an output signal indicative of the torque demand input by the driver of the vehicle to the steering column. This output signal is connected to a motor control circuitry which is adapted to control the motor in response to motor position signals, steering column torque signals and vehicle speed signals etc. The control circuitry provides a control signal to the motor drive circuitry which operates the motor to apply a torque to the steering column so as to assist the driver.

Figure 4:
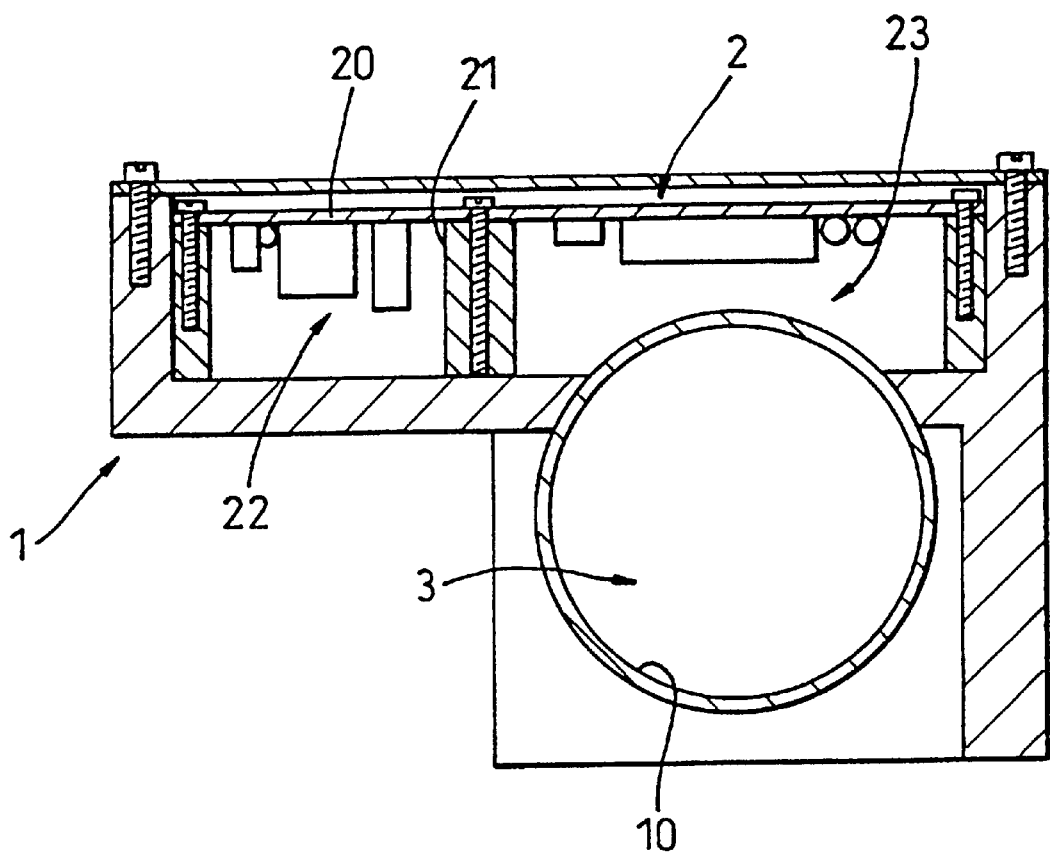
FIG. 4 is a view along the axis of the motor rotor of the motor housing with the control and drive circuitry and support member assembled in position.

The motor drive circuitry and control circuitry is disposed in the upper compartment 2 as shown in FIG. 4. This is advantageous as the electronic circuitry is thereby well shielded from the electric motor 12 which is sealed within the lower compartment 3. Furthermore, when the lid 28 is secured on the upper face of the side walls 7a,7b,8a,8b of the upper compartment 2, the electronic circuitry is also well protected from any external electromagnetic energy sources.

The motor drive circuitry and motor control circuitry is mounted onto a printed circuit board 20. For ease of construction, the circuitry is mounted onto the PCB 20 prior to installing the electronic circuitry within the upper compartment 2. The various electronic components are separated on the PCB so that the high power components (such as the motor drive circuitry transistors) are disposed on one half of the circuit board. The more sensitive electronic components, such as the motor control circuitry, are disposed on the other half of the circuit board.

Figure 5A:
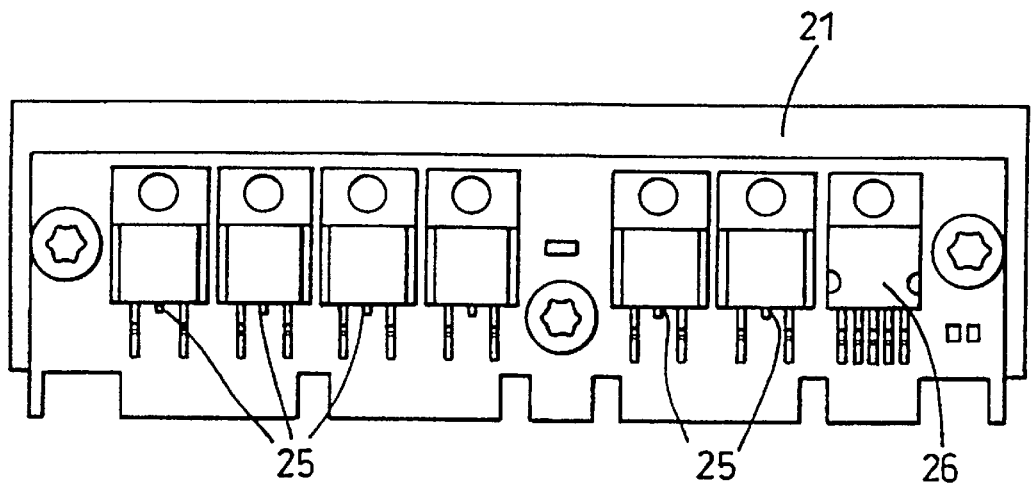
FIGS. 5(a),(b) and (c) are views of the support member and arrangement of the electrical motor drive components upon the support member.
Figure 5B:
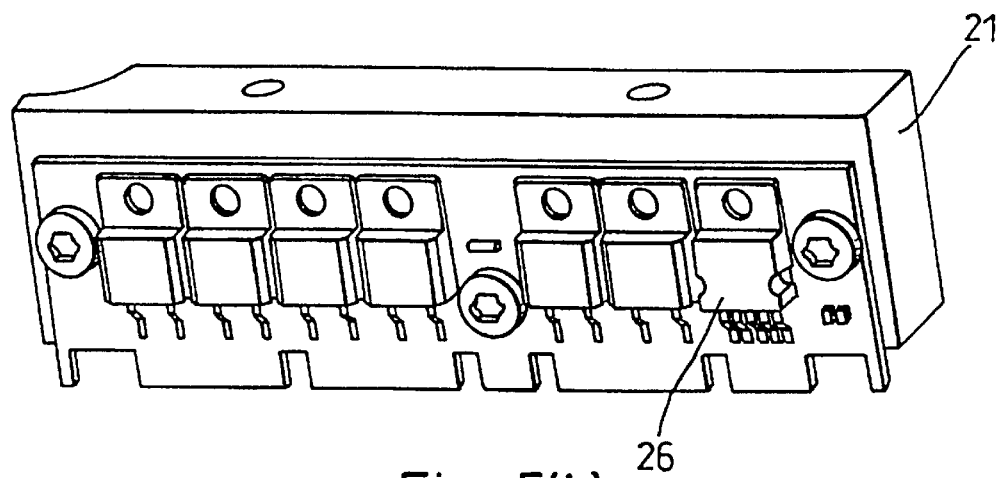
Figure 5C:
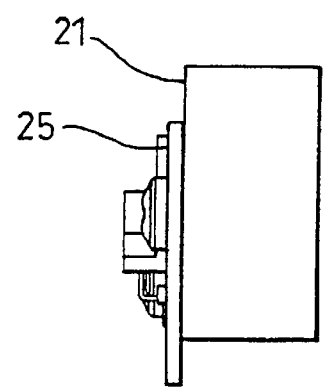

A metal (or other material) support member 21 is fixed on to one side of the circuit board across the centre of the board so as to separate physically the high power and lower power components. The support member 21 provides additional rigidity to the circuit board 20, and also performs the function of a heatsink for the motor drive transistors 25 of the drive circuitry, as shown in FIG. 5. Additionally, the support member 21 can also act as a heatsink for any other kind of device which requires heatsinking, for example, a regulator 26 as shown in FIGS. 5(a) and 5(b).

When the printed circuit board 20 is mounted in the upper compartment 2 to which the lid 28 is secured, the support member 21 forms a seal with the lower face 6 and sides 7a,7b,8a,8b of the upper compartment 2, effectively dividing the compartment 2 into sub-compartments 22,23 which are electromagnetically shielded from one another.

It has been found that this construction provides good electromagnetic compatibility (EMC) by shielding the components which may be susceptible to noise from the high power circuitry and the electric motor. Furthermore, this construction results in a minimum number of seals which are a potential source of leakage of electromagnetic radiation.

Where the support member 21 contacts the one-piece housing 1, heat can be conducted away from the electronic components into the housing itself. This can be further improved by providing fins (not shown) on the outside of the housing 1 to help radiate heat into the surrounding air. It has been found that sufficient heat can be dissipated in practice for the assembly to function without the need for providing external vents, for the upper compartment housing which would compromise the electromagnetic shielding of the circuitry.

It will be readily understood that the present invention lies in the alleviation of the effects of electromagnetic radiation on the electronic circuitry in an electric power assisted steering system by reducing the number of seals and other potential sources of leakage in the housing design. Furthermore, the inventors have appreciated that significant improvement can be made by physically separating the sensitive control circuitry from the high power drive circuitry and the relatively noisy electric motor.

Of course, it will be apparent to the skilled man that the present invention is not limited to electrical power assisted steering assemblies, but has for wider application where it is required to isolate part of an electrical device or electronic circuit from electromagnetic noise emitted from the part of the circuit.

Having described the invention, the following is claimed:

1. A housing assembly for an electric power-assisted steering system of the kind comprising an electric motor (12) connected through a gearbox to an output shaft operatively connected to a steering column for a vehicle, said housing assembly defining at least two discrete compartments (2, 3), a first one of said compartments (3) being adapted to house said motor and said gearbox 100, and a second one of said compartments (2) being adapted to house a motor control circuit and a motor drive circuit, a support member (21) being adapted to provide a physical barrier between said motor drive circuit and said motor control circuit, and wherein said support member (21) is adapted to form a seal with said housing (1) substantially to prevent electromagnetic radiation transmitting from one side of said support member (21) to the other side of said support member.

2. A housing assembly according to claim 1, wherein said housing comprises a one-piece casting.

3. A housing assembly according to claim 1 wherein said housing and support member comprise an integral component with said support member being made as an insert in a casting which forms said housing.

4. A housing assembly (1) according to claim 1, wherein said compartment is closed by a lid portion.

5. A housing assembly (1) according to claim 1, wherein said support member (21) is adapted to be mounted onto a printed circuit board (20) which carries at least a first electrical components adapted to emit electromagnetic radiation and a second electrical component which is sensitive to said radiation.

6. A housing assembly according to claim 1, wherein said support member (21) is adapted to act as a heat sink.

7. A housing assembly according to claim 1, wherein said support member (21) supports parts of the electrical circuit.

8. A housing assembly according to claim 1, wherein said support member (21) is made of metal.

9. A housing assembly according to claim 1, wherein said support member (21) is an integral part of said one-piece housing (1).

10. A housing assembly for an electrical device according to claim 1, wherein said support member (21) is adapted to be mounted onto said housing (1) through said printed circuit board (20) so as to substantially support said printed circuit board in place.

* * * * *

UNITED STATES PATENT AND TRADEMARK OFFICE
CERTIFICATE OF CORRECTION

PATENT NO. : 6,107,716
DATED : August 22, 2000
INVENTOR(S) : David Michael Penketh It is certified that error appears in the above-indentified patent and that said Letters Patent is hereby corrected as shown below:

Column 5, line 38, after "gearbox" insert "(100)"

Column 6, line 1, change "100" to "(100)"

Signed and Sealed this

First Day of May, 2001

Attest:

NICHOLAS P. GODICI

*Attesting Officer*     *Acting Director of the United States Patent and Trademark Office*